(12) United States Patent
Saito et al.

(10) Patent No.: US 7,627,323 B2
(45) Date of Patent: Dec. 1, 2009

(54) APPARATUS AND METHOD FOR LAYING OUT WIRELESS CELL, AND RECORDING MEDIUM FOR PROGRAMS ACHIEVING THE SAME

(75) Inventors: Jun Saito, Sagamihara (JP); Hitoshi Yokota, Kawasaki (JP); Tsutomu Hara, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 643 days.

(21) Appl. No.: 10/361,845

(22) Filed: Feb. 11, 2003

(65) Prior Publication Data

US 2003/0182095 A1 Sep. 25, 2003

(30) Foreign Application Priority Data

Mar. 19, 2002 (JP) ............................. 2002-075365

(51) Int. Cl.
*H04W 40/00* (2009.01)
(52) U.S. Cl. ..................... 455/446; 455/449; 455/422.1
(58) Field of Classification Search ................. 455/446, 455/423, 422.1, 449, 453, 448, 457, 67.7, 455/67.11
See application file for complete search history.

(56) References Cited

U.S. PATENT DOCUMENTS

| | | | | |
|---|---|---|---|---|
| 6,094,580 A | * | 7/2000 | Yu et al. ..................... | 455/446 |
| 7,110,768 B1 | * | 9/2006 | Bridges et al. ............... | 455/446 |
| 2004/0006500 A1 | * | 1/2004 | Guicciardi ...................... | 705/7 |

FOREIGN PATENT DOCUMENTS

JP 2000-333239 11/2000

* cited by examiner

*Primary Examiner*—Jean A Gelin
(74) *Attorney, Agent, or Firm*—McDermott Will & Emery LLP

(57) ABSTRACT

A system and method for automatically calculating an optimum layout of a wireless cell station in an environment using a wireless communication system, thereby achieving a time-saving and resources-saving cell design procedure. The system calculates an optimum layout of the wireless cell station based on information of terminal locations.

26 Claims, 10 Drawing Sheets

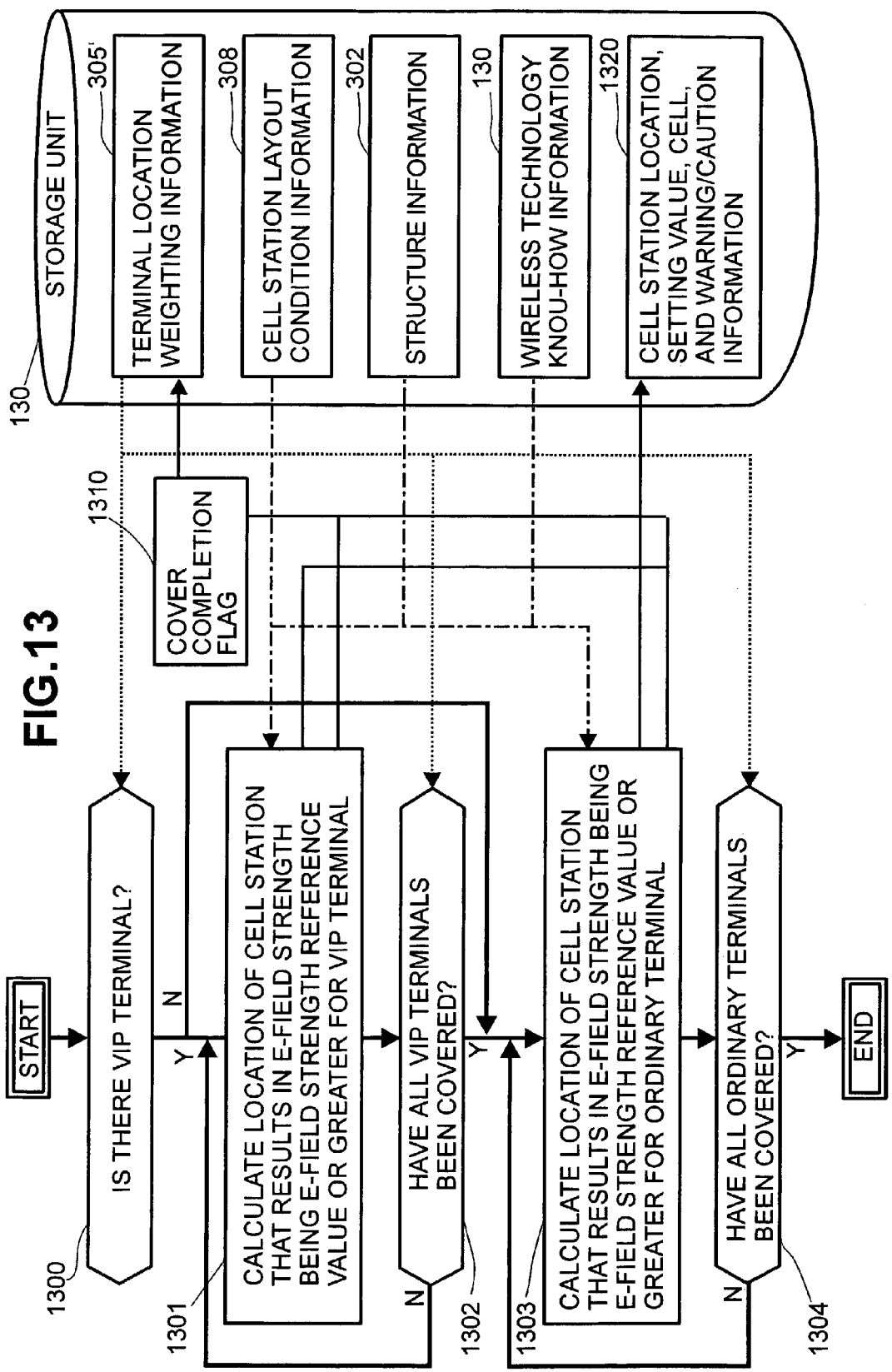

APPARATUS AND METHOD FOR LAYING OUT WIRELESS CELL, AND RECORDING MEDIUM FOR PROGRAMS ACHIEVING THE SAME

BACKGROUND OF THE INVENTION

The present invention relates to a wireless cell design technique that calculates an optimum layout of a wireless cell station in an environment using a wireless communication system and, more particularly, to an apparatus or a program for calculation of an optimum number and layout positions of cell stations for specific wireless terminals.

In a wireless communication system, for example, a wireless LAN, wireless communications are carried out between a cell station connected to a wired LAN and a wireless terminal provided with a wireless communication function. One of the characteristics the wireless communication system has is that it requires no wires. For example, in many instances, an indoor wireless LAN system is adopted for the reason of this very characteristic. In such cases, the wireless terminal is moved less frequently and it is not necessarily mandatory that wireless communications be possible throughout all indoor regions.

A cell design technique is known as part of the technology indispensable to implementing the wireless communication system. A wireless cell refers to a region that can be covered by a single cell station.

The conventional cell design technique is concerned with determining an optimum layout of the cell station in the wireless communication system. More specifically, it calculates the number and location of cell stations required to cover a specific region of the system based on the information on shapes of buildings that can affect wireless communications and positions of structures, such as a desk, and candidate locations of the cell stations. Japanese Patent Laid-open No. 2000-333239 discloses a technique relating to a method of determining an optimum layout of cell stations of this sort.

The conventional technique according to the publication above takes into account another characteristic of the wireless communication system that a wireless terminal is mobile. It therefore assumes that the cell stations should cover all applicable indoor regions. The technique performs calculations for even redundant cell stations in order that a region, at which the wireless terminal is in fact less likely to be installed, can be covered for good wireless communications.

SUMMARY OF THE INVENTION

One object of the present invention is to provide a cell design program that is capable of placing cell stations efficiently in regions, in which it is highly likely that wireless communications are carried out.

A cell design program according to an exemplary embodiment of the present invention is to calculate the number of cell stations required and the locations of the cell stations based on the locations of the wireless terminals making up a wireless communication system. The program is provided with a step that identifies the locations, in which wireless terminals will be placed, and a step that calculates the number and the locations of the cell stations that cover the wireless terminals previously identified.

In addition, if there are a plurality of wireless terminals placed in the system, the cell design program according to the exemplary embodiment of the invention is provided with a step for defining priority of the plurality of wireless terminals.

BRIEF DESCRIPTION OF THE DRAWINGS

FIG. 13 is a diagram showing another example of calculation steps of the present invention performed for finding an optimum number and locations of cell stations.

DETAILED DESCRIPTION OF PREFERRED EMBODIMENTS

The exemplary embodiments according to the present invention will be described with reference to the accompanying drawings. A first exemplary embodiment of the present invention will be described with reference to FIGS. 1 through 12. The first embodiment calculates a possible location at which a cell station is to be installed based on the information on the candidate locations of wireless terminals. The present invention can calculate a possible site or a possible position or the like for a cell station.

The cell station is an exemplary access point in a wireless LAN, corresponding to various types of cell stations that are installed at fixed locations. The access point is connected to a wired network, serving as a bridge between the wired network and the wireless network. Namely, the access point transmits data received from the wired network to a wireless terminal as a radio signal and transmits a radio signal received from the wireless terminal to the wired network. The wireless terminal is a wireless LAN client in the wireless LAN. It may be transportable. To gain a particularly remarkable effect from the application of the exemplary embodiment, however, the wireless terminal would preferably be one that is unlikely to be moved, one that is less frequently moved, a notebook computer which is moved through only a limited distance, and the like.

Figure 1:
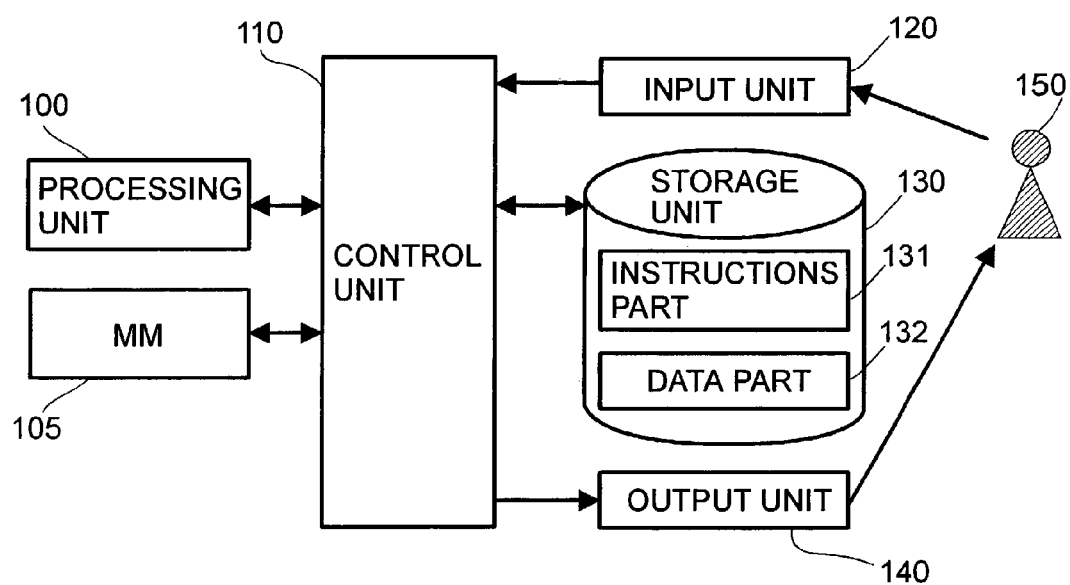
FIG. 1 is a diagram showing an exemplary system configuration of the present invention.

FIG. 1 shows a configuration of a computer system according to the first embodiment of the present invention.

The computer system is provided with a processing unit 100, a main memory unit 105, a control unit 110, an input unit 120, a storage unit 130, and an output unit 140. The processing unit 100 is connected via the control unit 110 to the input unit 120, the storage unit 130, and the output unit 140. The processing unit 100 executes a cell design program. The processing unit 100 corresponds, for example, to a CPU. The storage unit 130 stores therein cell design programs 131, 132 according to the first embodiment of the present invention. It may, for example, be a hard disk drive(HDD). The main memory unit 105 is used as a working memory that temporarily stores data and the like required by the processing unit 100 to perform calculations. It is, for example, a DRAM or other volatile memory.

The control unit 110 controls data exchanged between the processing unit 100 and each of the main memory unit 105, the input unit 120, the storage unit 130, and the output unit 140. It is, for example, a bus controller, a memory controller, an I/O controller, or the like. The control unit 110 may be an independent type, a type built into the processing unit 100, or a type composed of a plurality of chips.

The input unit 120 aids a program user (hereinafter referred to as the "user") 150 with a data input operation. For example, it may be a code input device such as a keyboard, a pointing device such as a mouse, or the like.

The storage unit 130 stores the cell design program according to the exemplary embodiment of the present invention, user input data, and results of processing operations. It may be an HDD, an FDD, a semiconductor memory, an MO drive, a DVD, and the like. A CD(compact disk), an FD(flexible disk), or the like, that stores therein the cell design program according to the exemplary embodiment of the present invention, is used to install the same in the storage unit 130.

The cell design program stored in the storage unit 130 includes two main parts. The first part is an instructions part 131 that stores processing procedures of the program. The second part is a data part 132 that stores data referenced in calculations for E field analysis and results of processing of the program.

Types of data stored in the data part 132 include, for example, RF(radio frequency) characteristics of each cell station, RF characteristics of each terminal, and characteristics information on structures according to materials used and types the structures fall into. The RF characteristics of each cell station and those of each terminal are concerned with respective areas, in which communications can be carried out. They may be stored in a form of an E field pattern or of a numeric value representing sensitivity. The data stored in the data part 132 may be part of the aforementioned characteristics, or include information on other characteristics. This holds true with the characteristics information to be described in the following.

The term "structure" as it is used in the foregoing description refers to an object that forms a cell partially/whole or one that exists inside the cell. It has a property of shutting off an electromagnetic wave. Examples of structures include a partition, a wall, a post, a door, a window, OA equipment, furniture, industrial equipment, and medical equipment.

The characteristics information concerning the structure includes: radio wave transmittancy and reflectance of each of the materials forming the structure; generated noise and interference characteristics; electronic device characteristics; industrial equipment characteristics; characteristics of whether noise is generated or not; and information on disability for installation of the cell station. Examples of generated noise and interference characteristics, electronic device characteristics, industrial equipment characteristics, and characteristics of whether noise is generated or not include another wireless communication system, a microwave oven, industrial equipment, and medical equipment, a radio wave frequency band of which overlaps. Examples of communication-disabled area, which is disabled for installation of the cell station, include a window that physically defies the installation, and information on communication-disabled areas designated near industrial equipment, medical equipment, or a metallic body that can induce erratic operations of the system. These types of information are stored according to a combination of a corresponding structure, material, and a shape. The explanation of numeric values representing the information will be omitted, as they do not form an essential part of the present invention.

Other types of information stored in the data part 132 include the information on the channel and the frequency band of the communication system, cell station setting items, terminal setting items, a variety of warning information, and a variety of cautionary information. The system may be configured so that the information on the cell station setting items and terminal setting items is obtained and stored through processing procedures of an equipment program or an equipment setting program added to the instructions part 131 or of inquiry made to a network database.

The cell design program according to the first embodiment of the present invention is configured, as described later, so as to calculate a location, at which the cell station can be installed, by acquiring and using information on candidate locations at which wireless terminals are to be installed. The information on candidate locations, at which wireless terminals are to be installed, may be stored in the data part 132 or the main memory unit 105.

The output unit 140 outputs results of execution for the user 150. Examples of the output unit 140 include a screen display unit, such as a display, and a printing unit, such as a printer.

It is to be understood that application of the cell design program according to the first embodiment of the present invention is not limited to the system of the configuration as described in the foregoing paragraphs. For example, the system shown in FIG. 1 is configured as a server and the server is connected further to a LAN or other type of network. The server acquires cell information including the information on structures, and information on candidate locations, at which wireless terminals are installed, via a network from a communication unit not shown. After the program is executed on the system, the results of calculation are then output to the network. The program may also be prepared so as to meet the need for a system composed of a plurality of cell stations by allowing the system to acquire also the information on the cell stations to be installed. In this case, a program input step using the input unit 120 to be described later is replaced by the input of information from the communication unit. An output step to be described later is replaced by the output of information from the communication unit.

Figure 2:
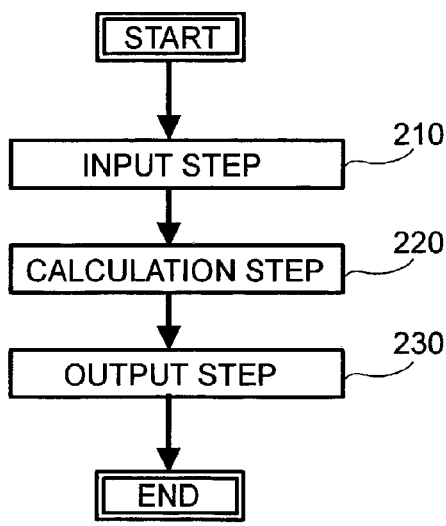
FIG. 2 is a flowchart showing an exemplary flow of operations for cell design of the present invention.

FIG. 2 shows a flowchart of the cell design program according to the first embodiment of the present invention. The operation of the cell design program is broadly divided into an input step 210, a calculation step 220, and an output step 230.

The input step 210 includes steps of entering the data that defines a space, in which a wireless LAN is installed, that is, the layout of the cell subject to the cell design, and candidate locations for terminals. The cell space may be either a closed space or an open space. The closed space is enclosed by some materials each of them having reflectance of a certain value. Examples of the closed space include an office, a house, and a factory. Many of the cell spaces in the wireless LAN are closed. It is nonetheless possible to apply the embodiment of the invention also to the open space.

The calculation step 220 is concerned with a process of calculating the candidate location for mainly the cell station by referring to the data entered in the input step 210 and the information stored in the storage unit 130. The output step 230 is for producing an output of results of calculation obtained in the calculation step 220 to a display unit or the like.

The input step 210 of the cell design program will be described in detail with reference to FIG. 3. When the cell design program is started and the input step is invoked, the processing unit 100 issues a structure data input request to the user 150 according to the program (step 300). Using the input unit 120, the user 150 inputs the structure data of a cell design area through a structure data input (steps 301 and 302). The structure data to be input include, for example, the type, shape, material, and location of the structure. A series of structure data inputs defines the cell area to be designed.

Input methods include input of drawings and capture of general-purpose CAD data. It is also possible to set up a manual or automatic input arrangement by connecting to the system shown in FIG. 1 a scanner or similar appropriate device that is capable of acquiring electronic geographic information including an electronic map, paper or other layout information, or geographic information transmitted from an artificial satellite. Still another possibility is to use the structure data 302 used in a previous session by storing it as a file in the storage unit 130. The structure data 302 input through any of these methods is stored in the storage unit 130 (step 302). The structure data of the cell design area is saved in the storage unit 130 in this manner.

The processing unit 100 next issues a terminal location input request 303 to the user 150. The user 150 then performs a procedure of a terminal location data input 304 through the input unit 120. The data to be input represents the location, at which a wireless terminal is installed, or a candidate location, at which a wireless terminal is to be installed. The input method according to the first embodiment of the invention is the same CAD input as in the structure data input. A position data input may be used based on moving image or still image information captured by a monitor camera or the like. Convenience will be even more enhanced if each of the input procedures is automated.

Still another arrangement for terminal location input is that the storage unit 130 stores performance information of a plurality of wireless terminals and the user is allowed to select the type of the terminal. Or, an arrangement may be made to let the user 150 enter individually a reception strength reference value for each of the wireless terminals as he or she inputs the terminal location. The wireless terminal location data is also saved in the storage unit 130 (step 305).

The processing unit 100 then issues a cell station layout condition input request 306. The cell station layout condition includes, for example, the allowable number of terminals connected to a cell station, information used to identify a specific installation location, if one is determined, and the condition that identifies the candidate location, at which the cell station is to be installed. In the same manner as with the structure data, data stored in the storage unit 130 may be used for the cell station layout condition. The cell station layout condition is input to the input unit 120 (step 307). In the case, in which this program is executed on the network as described earlier, recognition data that identifies the cell station to be placed is input in this step.

The cell station layout condition is stored in the storage unit 130 (step 308). The cell station layout condition is an optional function according to the first embodiment of the present invention, and is not indispensable to the system.

The calculation processing according to the first embodiment of the present invention will be explained with reference to FIGS. 4 through 9.

Figure 4:
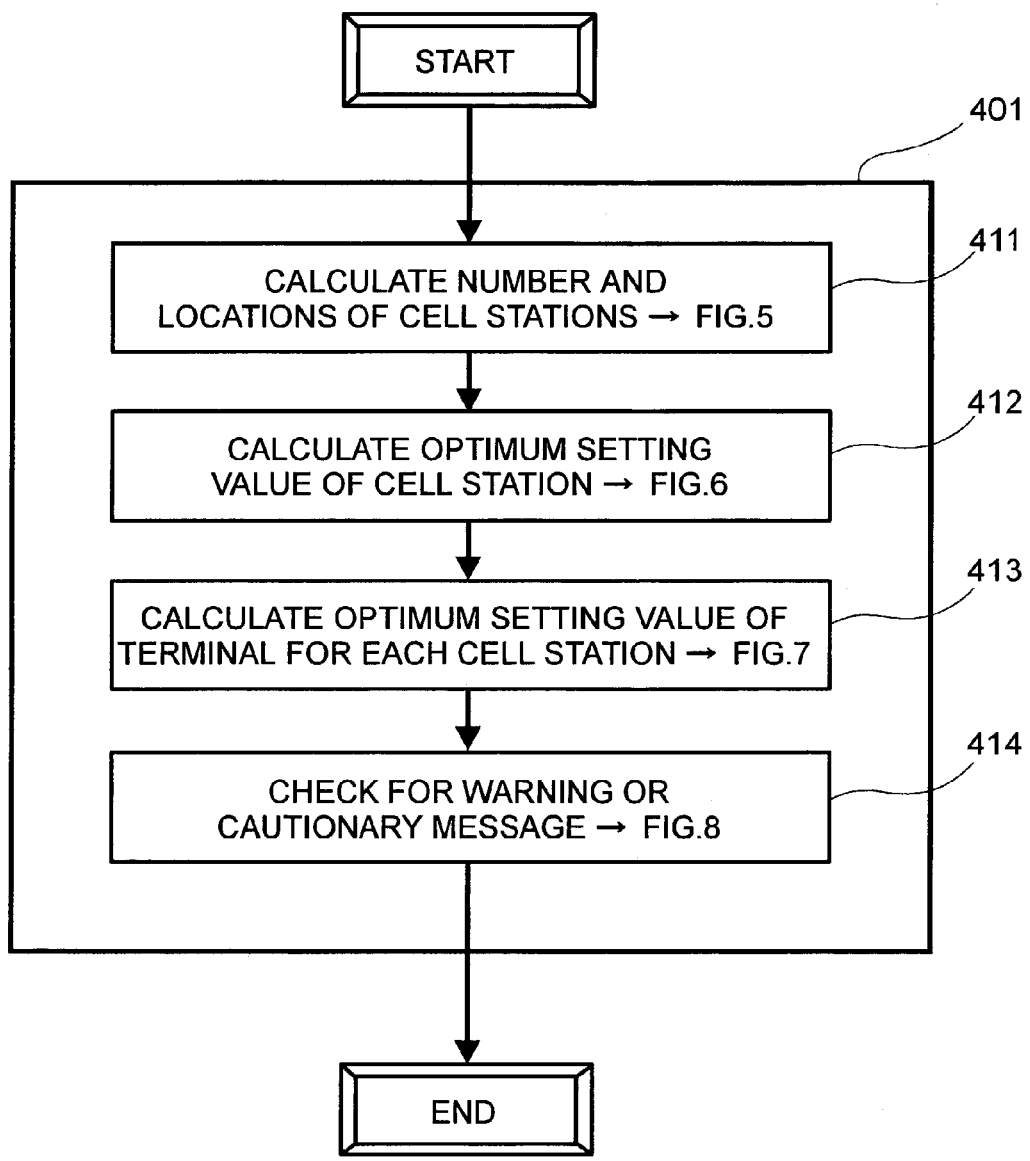
FIG. 4 is a flowchart showing exemplary calculation steps of the present invention.

Referring to FIG. 4, a calculation step 401 includes four subroutines. They are the steps of: calculation of the optimum number and locations of the cell stations 411; calculation of the optimum setting value of the cell station 412; calculation of the optimum setting value of the terminal 413; and, confirmation of whether or not there is a warning or cautionary message 414.

Figure 5:
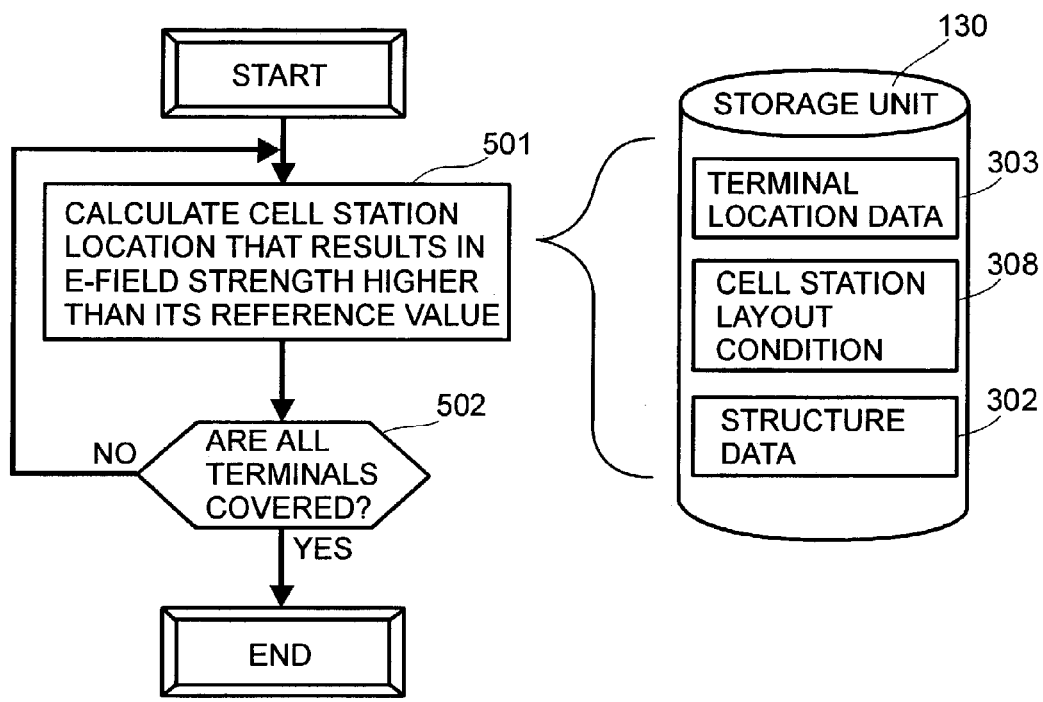
FIG. 5 is a diagram showing exemplary calculation steps of the present invention performed for finding an optimum number and locations of cell stations.

Referring to FIG. 5, when the calculation step 401 of the cell design program is started, the processing unit 100 refers to the terminal location data 305 stored in the storage unit 130 and acquires the information on the locations, at which terminals are installed, or on the candidate locations, at which terminals are to be installed. Based on the terminal location data acquired, the cell station location, which results in an E-field strength being the reference value or more at the terminal location, is calculated.

The following factors are used for this calculation. They are the RF characteristics and the E-field strength reference value of the terminal previously stored in the storage unit 130, and the RF characteristics of the cell station. Specifically, the calculation is made to determine whether or not there is a specific point available that covers all terminals within a circle having a radius identified by the combination of the aforementioned factors around the cell station. If it is not possible for a single cell station to cover all terminal locations, the number of cell stations to be installed is increased by one and it is determined whether or not two cell stations can cover all terminals.

Used also in the calculation are the structure data 302 and the cell station layout condition 308, if it is input in advance. For example, if a location for the cell station is set as the cell station layout condition 308, the input location is calculated as a first candidate location. When narrowing the layout locations in advance in this manner, the embodiment offers the benefit of shortening the calculation time. The structure data 302 can also be used to calculate so as not to select a location to be installed in an area that defies installation.

Figure 14:
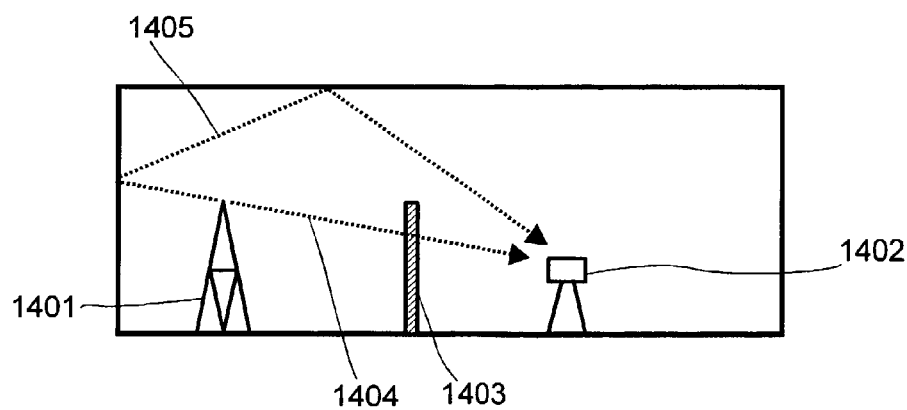
FIG. 14 is an exemplary diagram of the present invention illustrating how radio waves are reflected in a closed space.

Furthermore, an arrangement is possible that takes into account reflection from a structure, based on the structure data 302 and the information stored in the data part 132. Radio waves cell stations and terminals receive are both a direct wave and an indirect wave. FIG. 14 shows how radio waves are reflected in a closed space. A reference numeral 1401 represents a wireless cell station, a reference numeral 1402 represents a wireless terminal, a reference numeral 1403 represents a structure, a reference numeral 1404 represents a direct wave, and a reference numeral 1405 represents an indirect wave.

The direct wave 1404 reaches the terminal 1402 after attenuation by the amount equivalent to the transmittancy of the structure 1403. The indirect wave 1405, on the other hand, reaches the terminal 1402 after attenuation by the amount equivalent to twice as much as the reflectance of the material making up the closed space. The amount of the attenuation depends on the amount of the reflection. The E-field strength at the terminal 1402 is the sum of the strength of the direct wave and the strength of the indirect waves. If the information on these factors is considered as conditions, therefore, it becomes possible to make an even more strict cell design.

If the arrangement permits input of three-dimensional structure data, the candidate location for the cell station is determined including the height above a floor surface. In this case, the aforementioned circle is calculated as a sphere.

By calculating the candidate number and candidate locations of the cell stations so as to cover all terminals in the manner as described in the foregoing, it becomes possible to make an effective and practical cell design. Specifically, according to the first embodiment of the present invention, the location at which the terminal will be placed is input and, with reference to the E-field strength reference value at that particular location, the location of the cell station is determined. As compared with a case, in which it is assumed that the entire cell area is covered, therefore, it is possible to save the number of cell stations to cover even a location, at which it is unlikely that a wireless terminal is installed.

Figure 6:
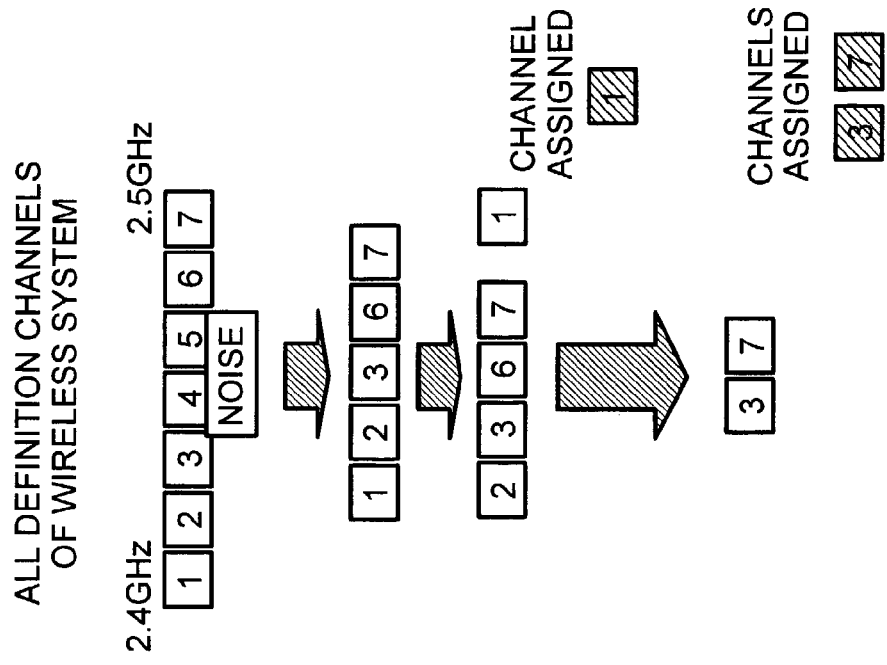
FIG. 6 is a diagram showing exemplary calculation steps of the present invention performed for finding an optimum setting value of the cell station.

FIG. 6 shows exemplary calculation steps performed for finding an optimum setting value of the cell station according to the first embodiment of the present invention. It shows the procedures, through which an optimum channel assigned to three wireless cell stations, as obtained through the aforementioned calculation made of the optimum number and locations of the cell stations, is calculated. The right part of FIG. 6 is a flowchart, while the left part thereof illustrates examples.

The processing unit 100 first determines whether a structure that serves as a noise source is input or not using the structure data input in the input step 201 (step 601). The processing unit 100 refers to the structure data 302 stored in the storage unit 130 and the data part 132. If any noise source is input, the information on the frequency range, in which that particular noise is generated, is obtained from the structure data 302. As an example, a noise generated in channels 4 and 5 of the wireless system channels is input.

The channels, of which frequency bands do not overlap the noises, are next selected (step 602). In the example, five channels out of the total seven from channel 1 through 7 are selected by excepting channels 4 and 5 of which frequency bands overlap those of the noises.

The examination to see if a channel is reserved is performed (step 606). This is done by referring to the cell station layout condition information 308 stored in the storage unit 130, thereby determining if a channel to be assigned to the cell station is input in the cell station layout condition input 307. In the example, in FIG. 7 channel 1 is reserved for one of the three cell stations. Specifically, the processing unit 100 assigns the channel 1 for the reserved cell station (step 604).

A channel interval is calculated in the next step (step 605). This represents processing, in which channels that are not mutually adjacent to each other are selected to avoid interference that would otherwise occur between two adjacent channels. Since channel 1 is assigned in advance, channels 3 and 7 are selected in the example. The reason why channel 7, instead of channel 6, is selected is to avoid interference with the noise source, in consideration of the fact that the noise source exists in the frequency range of channel 5. If there exists a cell station that is free from effect from the noise source because of the E-field strength characteristics of the noise source used, an approach is also possible in which channel 6 is assigned to that particular cell station, or channel 4 or 5 is assigned thereto. This approach is effective if it is necessary to install a large number of cell stations.

Channels are selected in step 605 and they are assigned to the remaining two cell stations (step 606). It is possible to allocate frequencies to the cell stations that are located at the locations and in the number as calculated through these calculation steps for the optimum setting value.

Figure 7:
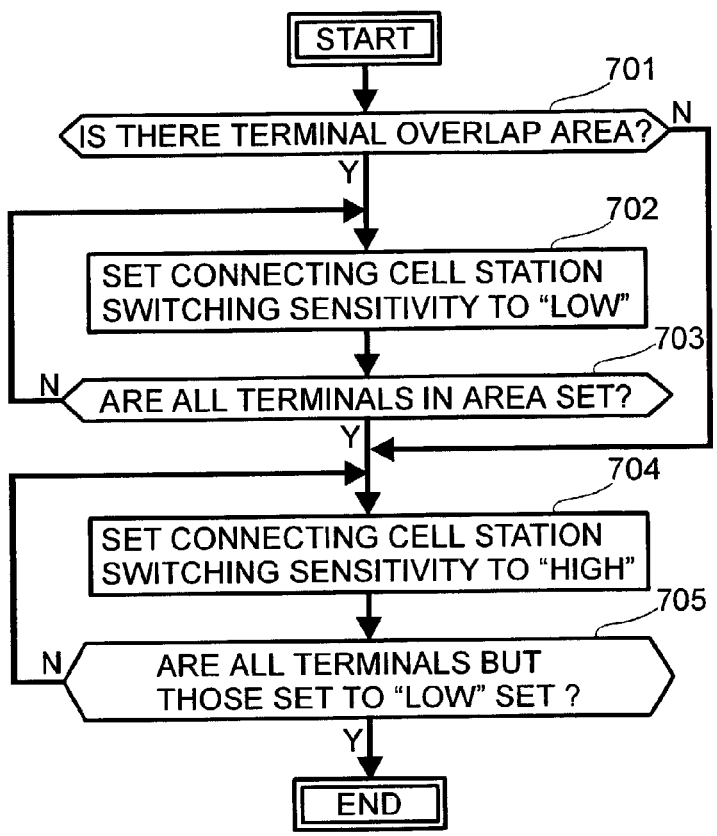
FIG. 7 is a flowchart showing exemplary calculation steps of the present invention performed for finding an optimum setting value of a terminal.

The calculation of the optimum setting value for the terminal according to the first embodiment of the present invention will be explained. FIG. 7 shows exemplary calculation steps performed for finding an optimum threshold value of the wireless LAN terminal for changing the connecting cell station. Suppose that a terminal is located at a point within an area covered by a plurality of cell stations. More specifically, if the coverage area of one cell station overlaps that of another cell station and that particular terminal is located in that overlapping area, then the connecting cell station can be easily changed resulting in roaming occurring frequently. Since the frequently occurring roaming decreases communication throughput of the terminal, it is desirable that a setting be made to allow connection to one of the cell stations to be established more readily and easily than that to the other. According to the first embodiment of the present invention, a preferential connection is determined through the setting made of the optimum threshold value of the terminal for changing the connecting cell station.

If there is an overlap of coverage areas of a plurality of cell stations, the processing unit 100 first determines whether or not the location at which a terminal is placed is input in the overlapping area (step 701). If there is, a connecting cell station switching sensitivity is set to "Low" (step 702). The connecting cell station switching sensitivity is the E-field strength reference value established for that particular terminal. Selecting "Low" for the connecting cell station switching sensitivity is to lower the sensitivity down below the E-field strength reference value. The amount of sensitivity lowered may be a predetermined amount, or the sensitivity may be lowered in a stepwise fashion.

After all wireless terminals existing in the overlapping area are subjected to the same procedures (step 703 and step 702), the connecting cell station switching sensitivity for the wireless terminals existing outside the overlapping area is set to "High" (step 705). This procedure is to give those terminals existing outside the overlapping area a relative differentiation from those existing inside the overlapping area. It is therefore not absolutely necessary as long as the amount of sensitivity lowered in step 702 is sufficiently large.

This procedure reduces the E-field strength developing when the wireless terminal changes its connecting cell station, thus making it possible to decrease roaming occasions.

It is also possible, in this flow, to adjust the number of terminals to be connected to the cell station. If terminals are to be placed at a time in all of a large number of locations to be installed input in the system, it becomes necessary to take into account dispersing load on the cell station. An optional arrangement is therefore possible, in which the information on a candidate location at which the terminal is to be placed input in the system is used to adjust the number of terminals connected to the cell station.

For example, if there is a terminal existing within the overlapping area, the terminal may be assigned to a cell station having a fewer number of terminals connected thereto, instead of adjusting the connecting cell station switching sensitivity. Or, if the maximum number of terminals that can be connected to a cell station is limited and set in the sell station layout condition, an additional cell station may be installed in the system. In this case, the operation should go back to step 401 again to perform the calculation of the location at which the cell station is to be installed.

Figure 8:
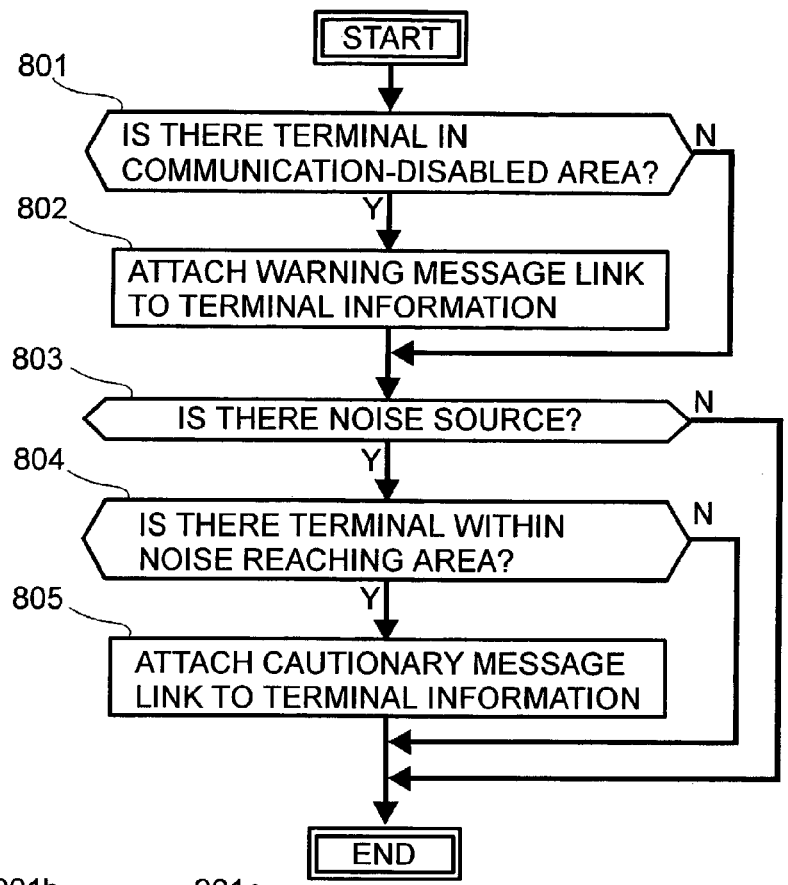
FIG. 8 is a flowchart showing exemplary calculation steps of the present invention for a warning and a caution.

The following explanation is about the calculation of a warning and a caution according to the first embodiment of the present invention. FIG. 8 shows calculation steps for the warning when a terminal exists inside the communication-disabled area and calculation steps for the caution when a terminal exists inside a noise reaching area.

The processing unit 100 first determines whether or not there is a terminal inside the communication-disabled area. The communication-disabled area is calculated using the structure data 302 stored in the storage unit 130 and the information contained in the data part 132. For example, the processing unit 100 uses the structure data 302 to determine a location, at which it is preferable that a wireless terminal not be located, such as an area near a window and a metallic structure. It then uses the information in the data part 132 to calculate the communication-disabled area corresponding to that particular structure.

If there is a wireless terminal located inside the communication-disabled area, a warning message corresponding to the type of the structure is extracted from the data part 132 and attached to the corresponding terminal information (step 802).

It is next determined using the structure data 302 of the storage unit 130 whether or not there is a noise source (step 803). If there is a noise source, the noise reaching area of the noise source is extracted from the data part 132. It is then determined whether there is a terminal existing inside the noise reaching area (step 804). If there is, a cautionary message corresponding to the noise source is attached to the corresponding terminal information (step 805).

The foregoing approach represents the specific form of the first embodiment of the present invention. That is, according to the first embodiment, the locations at which wireless terminals are to be placed are first identified before the locations at which the wireless cell stations are to be installed are changed. The approach therefore takes into consideration possible effects from components of the cell or structures inside the cell. By providing the user with a display message warning against a possible fault as the location at which the wireless terminal is placed, it is possible to leave room for advising the user of the change the location at which the wireless terminal is placed.

Figure 9:
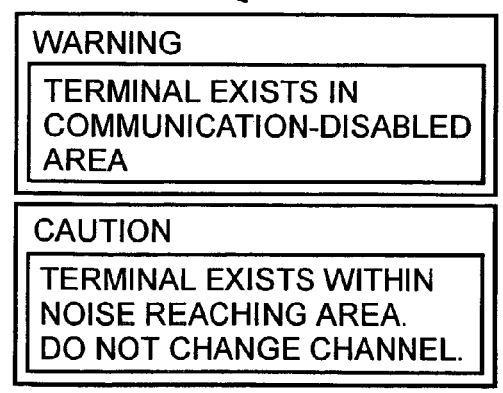
FIG. 9 is a diagram showing an exemplary relationship of reference between terminal position information and other types of information of the present invention.

FIG. 9 shows a table 901 that shows results of settings made in the terminals as calculated through the processing of FIGS. 7 and 8 and is stored in the storage unit 130, and an exemplary data link relation. The table 901 may be configured as the same file as the terminal location data 303, or an independent file.

The table 901 includes the following items: a location information 901a, a setting value information 901b, and a character link 901c. The location information 901a contains the locations of wireless terminals stored through the input step. The setting value information 901b represents the setting values of the connecting cell station switching sensitivities set through the flow shown in FIG. 7. These setting values are replaced by strength values using strength data not shown. The character link 901c indicates the address of a specific warning message or a cautionary message included in warning and cautionary information contained in the data part 132, displayed for a terminal that exists inside the communication-disabled area or the noise reaching area.

Figure 10:
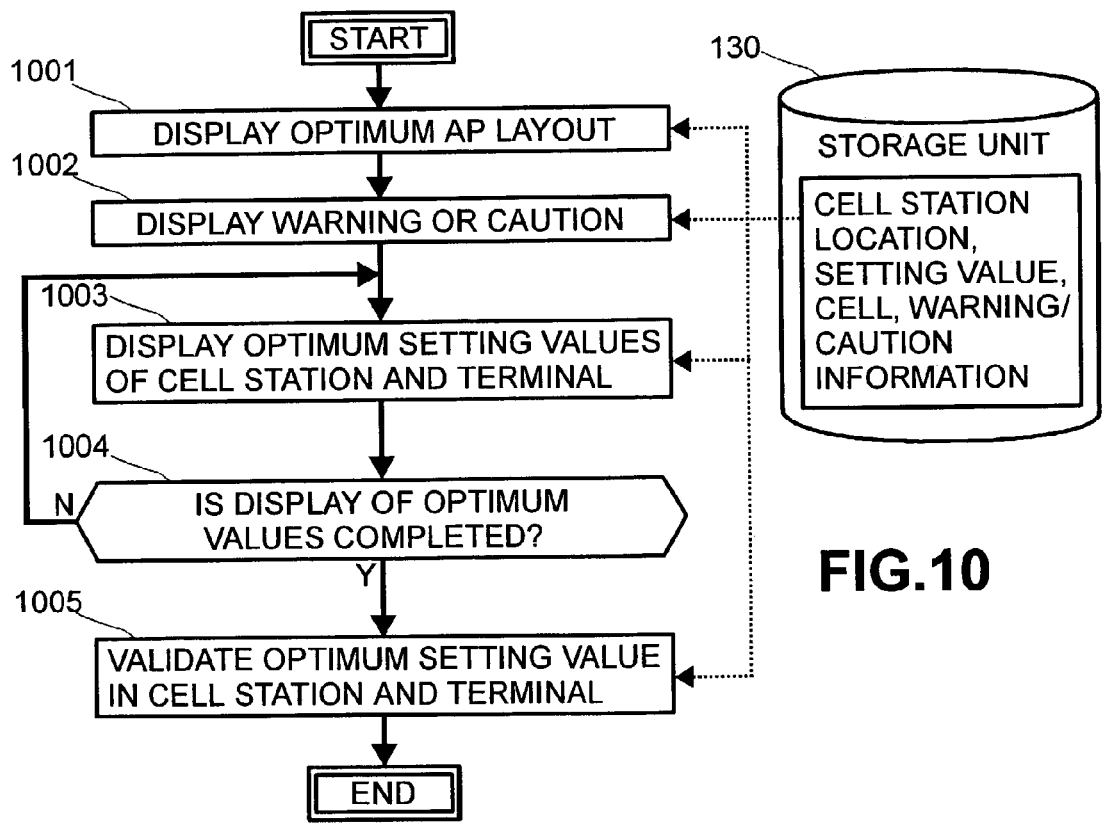
FIG. 10 is a diagram showing an exemplary operation/data flow in the output step of the present invention.

The processing for producing an output of the information calculated through the calculation step will be explained with reference to FIG. 10.

When the cell design program is started and the output step is invoked, the layout information stored in the storage unit 130 is referenced and the optimum number and locations of the wireless cell stations, as calculated through the processing shown in FIG. 5, are displayed (step 1001).

The warning and cautionary information is referenced using the character link 901c and the warning or cautionary message obtained through the steps shown in FIG. 8 is displayed (step 1002). The optimum setting values of the cell stations and terminals are thereafter displayed. A wireless LAN channel is an example of the setting value of the cell station, while a roaming setting value of the connecting cell station switching sensitivity and a setting value of the connecting cell station registration are examples of the setting value of the terminal. The contents of this display may be changeable through input made from the input unit 120.

It is then confirmed that the display of the optimum values is completed. This procedure is performed through input from the input unit. If the routine is not terminated with no input made, it returns to the step for optimum value check.

If it is confirmed that the display of optimum values is completed, the optimum values for the cell stations and terminals are validated. Exemplary validation procedures include: the cell design program runs with cell station setting software and terminal setting software so as to automatically incorporate the setting values; and, with the cell design program the processing unit 100 generates an execution format file that is started by the user to automatically incorporate the setting values. Another arrangement is possible, in which the network address information of the cell stations and terminals, setting authentication information for the cell stations and terminals, network identifiers, and encryption keys are input and saved in the input step 210, in anticipation of automatic validation of the setting values. Another possible output function is to incorporate the output results in the general-purpose CAD data.

Figure 11:
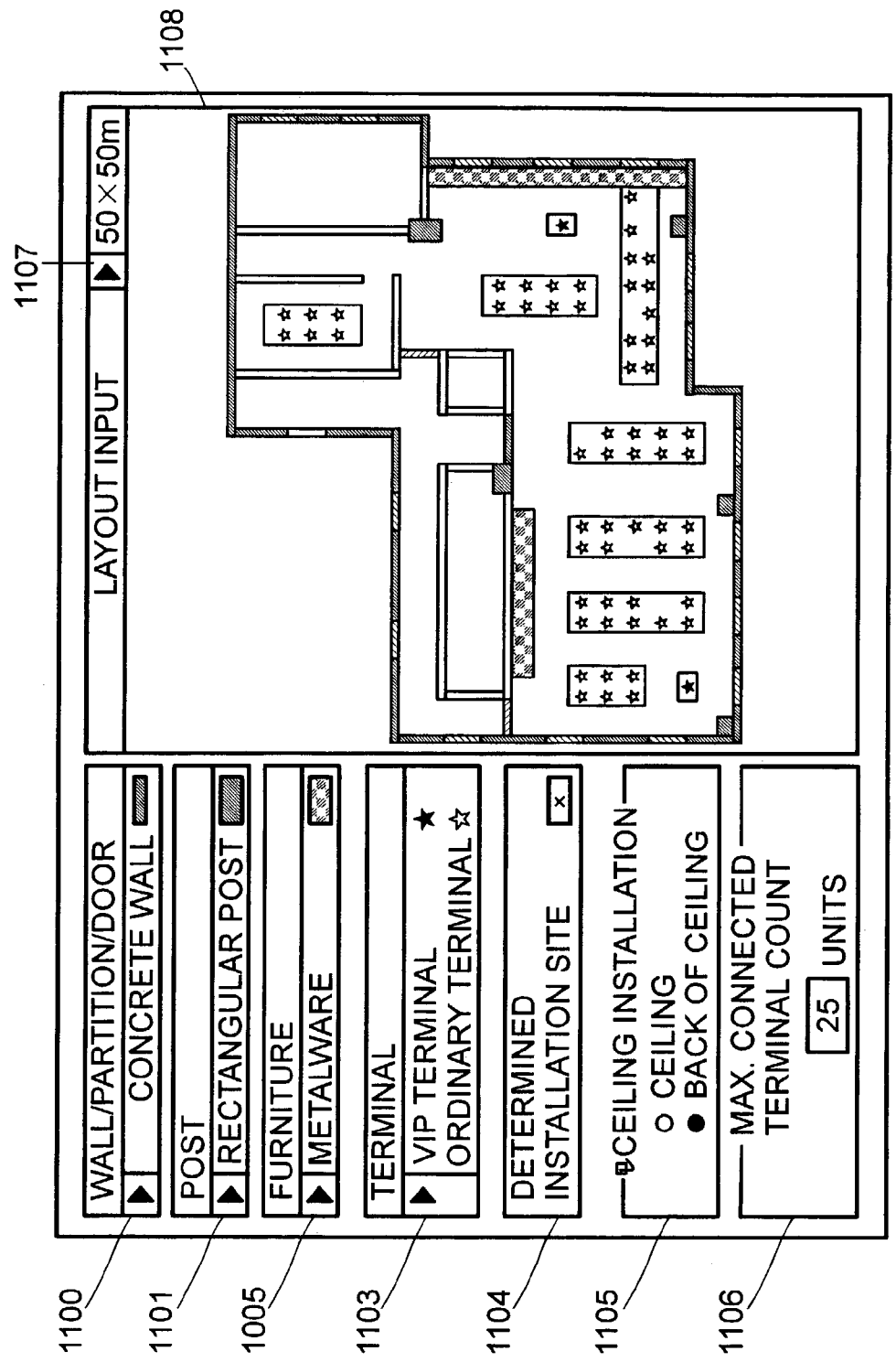
FIG. 11 is a diagram showing a exemplary input screen of the present invention.
Figure 12:
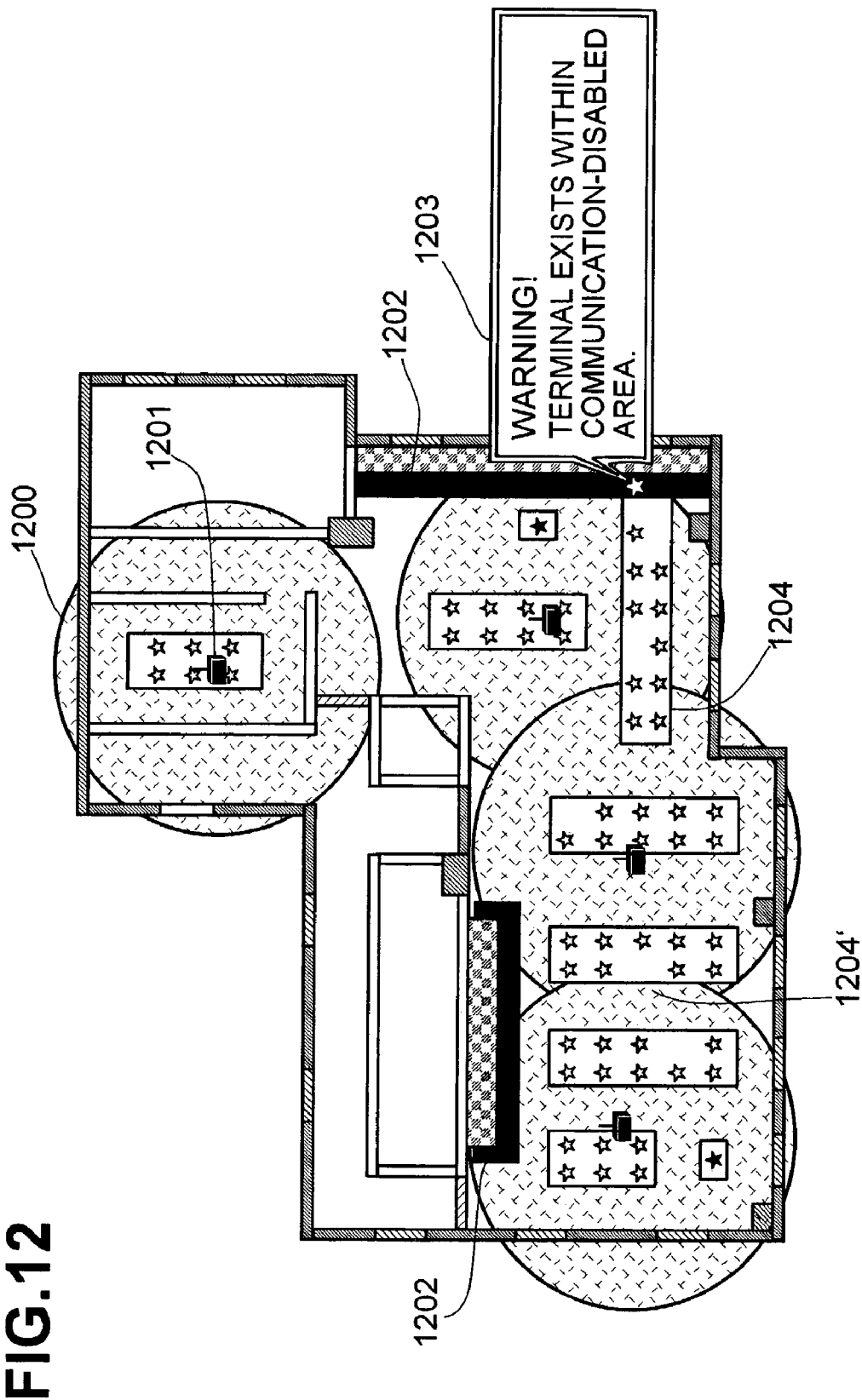
FIG. 12 is a diagram showing an exemplary output screen of the present invention.

FIGS. 11 and 12 show examples of display screens. FIG. 11 is an exemplary input screen for the input step. FIG. 12 is an exemplary output screen showing calculation results. Referring to FIG. 11, an input screen 1107 according to the first embodiment of the present invention is provided with a plurality of pull-down menus 1100 to 1106 on the left-hand side of the screen and a layout input screen 1108 on the right-hand side of the screen. The pull-down menus are used for the input of the structure information and the cell station layout condition. The layout input screen is used for inputting the shape of the structure and the location of the terminal.

Of the plurality of pull-down menus, a wall/partition/door button 1100 is concerned with a structure that cannot be moved. It allows the user to select the material of each structure. Each time such a structure is input, the corresponding material is selected and, through the layout input, the shape and the location of the structure are input. A post button 1101 is used for selecting the shape and the material. The location and the size of the post are input through a layout input screen 1107. A furniture button 1102 is used for selecting the shape, material, and type. The location and the size of the furniture are input through the layout input screen 1107.

In addition, according to the first embodiment of the present invention, the structure is further classified into the following three categories. They are: (1) those structures that cannot be moved and function to separate one space from another; (2) other structures that cannot be moved than those falling into (1); and, (3) those structures that can be moved. To classify the aforementioned examples, the partition, wall, door, and window fall into category (1); post falls into category (2); and, OA equipment, furniture, industrial equipment, and medical equipment fall into category (3). Examples of open cell spaces include buildings, mountains, and trees.

A terminal button 1103 is clicked to input the location of a terminal. FIG. 11 shows two types of terminals explained in a second embodiment of the present invention.

A determined installation location button 1104, a ceiling installation button 1105, and a maximum connected terminal count 1106 are used to input the cell station layout condition. The determined installation location button 1104 is used to input, if a location for the cell station is determined, that particular determined installation location. To input a determined installation location, select the determined installation location button 1104 and describe the determined installation location on the layout input screen 1107. An arrangement that allows the height from the floor surface to be input for the determined installation location may also be provided.

The ceiling installation button 1105 and the maximum connected terminal count 1106 are used to set an allowable number of terminals to be connected to a single cell station and to define feasibility of ceiling installation of the cell station as part of the cell station layout condition, though it was not touched upon in the explanation of the input of the cell station layout condition. In addition to ceiling installation, an underfloor installation button may be provided to allow the user to define whether underfloor installation is possible or not. With the maximum connected terminal count 1106, type the number of terminals to be covered by a single cell station, if it is determined, in a maximum connected terminal count field 706. If the count is not set, a default value is entered.

In addition, it is also possible to allow the user to select the reserved channel mentioned earlier by presenting the user the channel or the frequency band that will bypass noise. This reflects consideration given to a case, in which it is inevitable that a wireless cell station is installed near a noise source and the frequency band of the noise is known.

Fields that allow the user to define the model of the wireless cell station to be installed may further be provided. In this case, the E field pattern of each of the wireless cell stations is referenced from the data part 132 of the program for calculation of the coverage area in the calculation step. In addition, an estimated cell station count field may also be displayed, in consideration of a case, in which the number of cell stations to be installed is already determined from budgetary constraints.

FIG. 12 shows an exemplary output screen of the cell design program.

A black cuboid located at the center of a circle 1200 is a wireless cell station and the area enclosed by the circle 1200 is a wireless cell. Other exemplary output screens include: a screen showing the coverage area or the like from the viewpoint of each cell station; a screen showing an overlap condition or the like of a wireless cell from the viewpoint of each terminal; and a screen that shows a three-dimensional cell design result with the layout input three-dimensionally.

A black area 1202 near a checkered pattern is the communication-disabled area, in which communications are affected by the type and property of the structure. If a terminal exists in this area, a warning message 1203 will be displayed as shown in FIG. 12. Another method of giving the warning or cautionary message is to make a remote access to the corresponding terminal and give a warning message on the screen of the terminal or sound a warning buzzer.

Wireless terminals located in areas 1204 and 1204' exist in a region, in which cell areas of two cell stations overlap. They are therefore subject to the calculation of the number of connected terminals as explained in the description for FIG. 7.

As evident from the foregoing descriptions, the cell design program according to the first embodiment of the present invention gives a wireless communication system designer the display of the number and locations of the wireless cell stations, or the optimum setting value of the cell station or of the terminal, or the warning or cautionary message, or automatically sets the same in each of the cell stations and terminals. This helps the system designer easily install cell stations and terminals at the displayed locations.

With the cell design program according to the first embodiment of the present invention as described in the foregoing the processing unit 100 identifies candidate locations, in which wireless terminals are to be installed, and, considering these candidate locations and performance of the wireless terminals and wireless cell stations, calculates candidate locations at which the wireless cell stations are to be installed. Through the arrangements as described in the foregoing, it is possible to implement a cell design that covers areas, in which wireless terminals are likely to be installed, without having to cover all spaces to be served by a wireless LAN.

With the program the processing unit 100 also identifies the types and locations of structures, as well as the candidate locations for the wireless terminals, thereby ensuring that the candidate locations are good for wireless communications. This allows the user to detect a particular location that is not suitable for installation of the wireless terminal.

The arrangements also save labor and resources in calculating the optimum number and locations of cell stations for fixed wireless terminals, the optimum setting value of the cell station, the optimum setting value of the terminal, or the warning or cautionary message.

A second embodiment of the present invention, which assigns priorities to the candidate locations of wireless terminals, will be explained. There are wireless terminals, for which good radio wave conditions must be preferentially provided. They are the wireless terminals that frequently use the network and one that is operated by a person of important position. For each of these wireless terminals, importance information is input and priority is assigned so that the location at which the terminal is placed is calculated so as to ensure good radio wave conditions as received from the wireless cell station.

Figure 3:
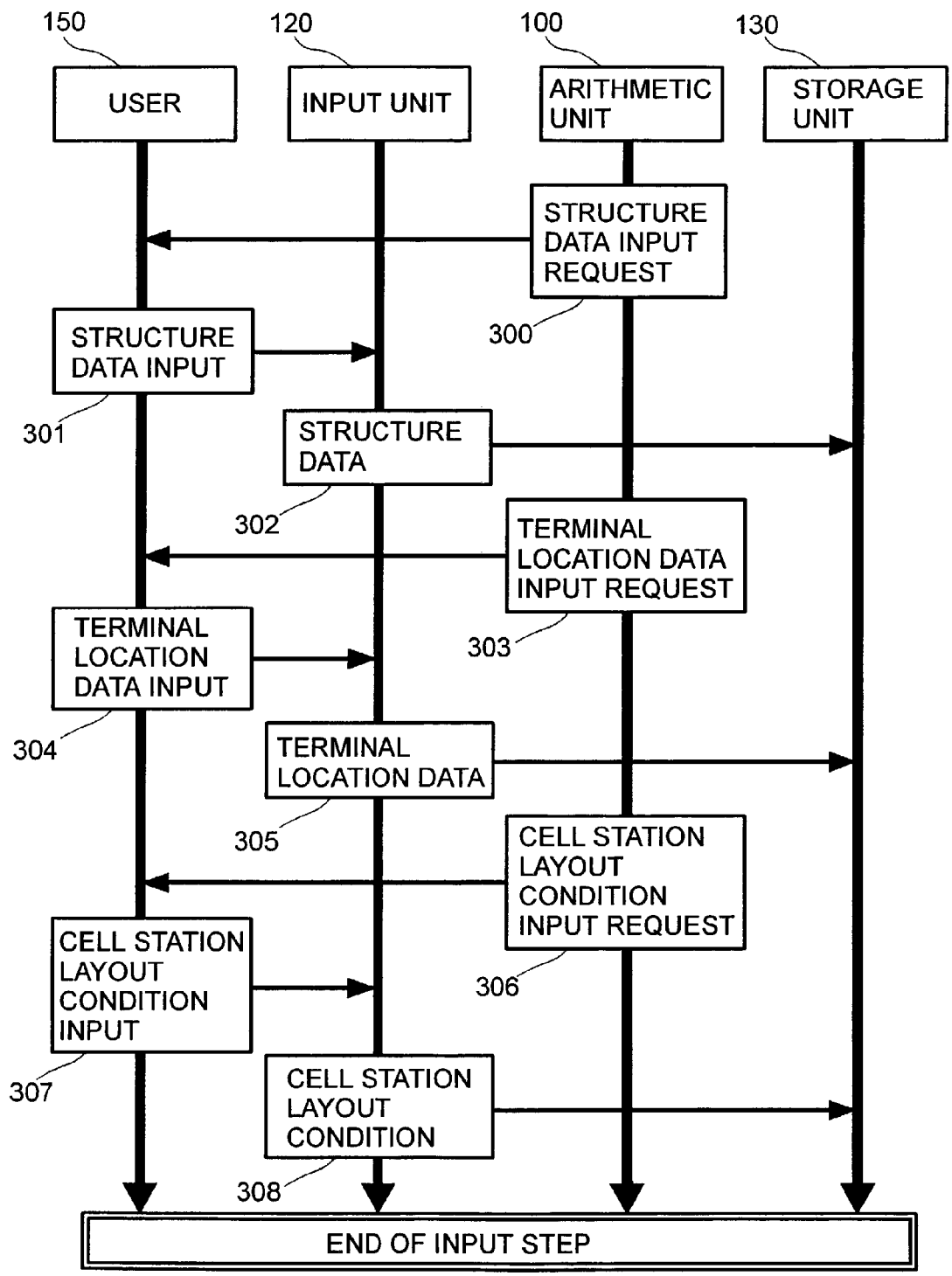
FIG. 3 is a diagram showing an exemplary data flow in the input step of the present invention.

Importance attached to a specific wireless terminal to be installed can be input at the same time that the terminal location data input (step 304) is made in FIG. 3. Applicable input method is as follows. Referring to FIG. 11, the option of "VIP terminal" is selected in the terminal button for a terminal of high importance and the terminal is input on the layout input screen 1107. The input information is stored in the storage unit 130 as a terminal location weighting information 305'.

According to the second embodiment of the present invention, the terminal, for which particularly powerful E-field strength must be provided, is called the VIP terminal, while other terminals are called the ordinary terminal. For the terminal which is input as the VIP terminal, the terminal location weighting information 305' revises the E-field strength reference value and sets a higher value therefore. Keys that may be used to differentiate the VIP terminal from the ordinary terminal include the E-field strength (e.g., strong, medium, weak) and the wireless LAN operating mode (e.g., 11 Mbps, 5.5 Mbps, 2 Mbps, and 1 Mbps).

It goes without saying that an arrangement is also possible, in which the importance is input after the terminal is placed on the layout input screen. In addition, a method can also be used, in which weighting information is input through network personal information or network use frequency information.

FIG. 13 shows a calculation flow for finding the number and locations of cell stations when priorities are assigned to different locations at which wireless terminals are placed. The flow corresponds to step 411 shown in FIG. 4.

The processing unit 100 first refers to the terminal location weighting information 305' stored in the storage unit 130 to determine if there is a VIP terminal (step 1300). If there is a VIP terminal, the processing unit 100 then refers to the cell station layout condition data 308, the structure data 302, and the like to calculate the location of the cell station that results in the E-field strength being the E-field strength reference value or greater for the VIP terminal. The cell station location is the logical product of a circle around the VIP terminal, in which the E-field strength reference value is maintained, and the cell station layout condition. An E field pattern of each cell station is referenced for the range of the E-field strength reference value.

At the same time, the processing unit 100 also calculates the location of the ordinary terminal, at which the E-field strength from the calculated cell station location remains the reference value or more. The results of calculations are saved as the cell station location in the storage unit 130. The information of the terminals covered by the cell is also stored as a cover completion flag in the terminal location weighting information 305'. The cover completion flag is used to determine whether or not a terminal is covered by either one of the cell stations. It is also used to differentiate a wireless terminal that is already covered through the calculation of the cell station location performed in relation to the VIP terminal from one that needs to be covered in the subsequent step of a step 1303.

The program then proceeds to the next step of confirmation by means of the cover completion flag that all VIP terminals are covered (step 1302). Finding that all VIP terminals are covered, the program proceeds to the next step of calculation of the cell station location, at which the E-field strength of the ordinary terminal is the reference value or more (step 1303). The processor refers to the cell station layout condition data 308, the structure data 302, and the like at this time, too. The cell station location is the logical product of a circle around the location of a terminal, in which the E-field strength reference value is maintained, and the cell station layout condition. This particular terminal is among those yet to be covered and location coordinates thereof are the greatest or the smallest. That is, the terminal is located on the outside with respect to the other terminals that exist inside the area and that are yet to be covered.

The wireless terminal locations subjected to the calculation performed in step 1303 are those of the wireless terminals that are not covered in the aforementioned step 1301. In the same manner as with the VIP terminal, the calculation results are stored in the storage unit 130. The information of the terminals covered by the cell of a new cell station is saved as the cover completion flag in the terminal location weighting information 305'.

As the final step, the processing unit 100 refers to the cover completion flags and makes sure that all terminals are properly covered (step 1304).

According to the second embodiment of the present invention, the calculation of the location at which the cell station is to be installed with reference to the VIP terminal is performed separately from the calculation of the location at which the cell station is to be installed with reference to uncovered ordinary terminals. It is, however, possible to perform these calculation at the same time. More specifically, the E-field strength reference value of the terminal can be approximated by a circle or a sphere with the location to place the corresponding terminal at its center. The VIP terminal differs from the ordinary terminal, in that the radius of the circle or sphere of the VIP terminal is smaller than the radius of the circle or sphere of the ordinary terminal. An approach can therefore be taken, in which the radius data of these circles or spheres are set in advance in the data part 132 according to the RF characteristics and E-field strength values of the terminals and cell stations, and the cell station is preferentially installed in an overlap between these circles or spheres. This approach makes it possible to calculate the location at which the cell station is to be installed using simple calculation results.

According to the second embodiment of the present invention, the location at which the cell station is installed is calculated by assigning priorities to the terminals. This makes it possible to determine the location to install the cell station so as to provide a better communication environment at the location of a terminal having high priority. In addition, since the location at which the cell station is to be installed is calculated according to the order of priority, the layout location can be narrowed down in advance even with no determined installation locations previously input. This makes for a shortened calculation time.

The optimum number and locations of the wireless cell stations are calculated based on candidate locations of wireless terminals according to these exemplary forms of embodiment. This enables timesaving and resources-saving cell design.

As mentioned above, in the programs of the present invention, the cell is designed by calculation based on the information of the candidate locations of wireless terminals to be placed. Calculation is executed to cover the candidate locations of the wireless terminals. That is, the number of cell stations to be installed will be reduced with the present invention.

Various changes and modifications of this invention as described will be apparent to those skilled in the art without departing from the spirit and scope of this invention as defined by the following claims.

What is claimed is:

1. A storage unit recording a cell design program that designs a location at which a wireless cell station is to be installed in a cell space of a wireless communication system, said cell design program comprising the steps of:
   a first step that obtains first information that defines a shape of a space or layout information of a makeup constituting a space, in which said wireless communication system is installed, said first information comprising a radio wave transmittancy and a reflectance of each material used in said space;
   a second step that obtains second information concerning a candidate location to be set for a wireless terminal that is to be installed in said space; and
   a third step that calculates a location at which said wireless terminal is to be installed so that said wireless terminal is included in a communication coverage area of said cell station, from said first and second information and a communication coverage area of said cell station and a communication coverage area of said wireless terminal,
   wherein said communication coverage area of said cell station is calculated from said shape of said space and said radio wave transmittancy and said reflectance.

2. The storage unit recording the cell design program according to claim 1, calculation in the third step being further based on RF characteristics of a cell station to be installed and RF characteristics being of said wireless terminal.

3. The storage unit recording the cell design program according to claim 2, wherein, when plural candidate locations of said wireless terminal are obtained, an overlapping area of coverage areas defined from the RF characteristics of said wireless terminal is preferentially determined in said third step as the location at which said wireless cell station is to be installed.

4. The storage unit recording the cell design program according to claim 1, said program further comprising:
   a fourth step that produces an output of the calculated location at which said wireless cell station is to be installed to an output device.

5. The storage unit recording the cell design program according to claim 2, wherein the first information and the second information are obtained through a network in the first and second steps, said program further comprising:
- a fifth step that produces an output of calculation results of the third step to the network.

6. The storage unit recording the cell design program according to claim 1, said program further comprising:
- a sixth step that assigns priorities to said wireless terminal, wherein the location at which said wireless cell station is to be installed is calculated using said priorities in said third step.

7. The storage unit recording the cell design program according to claim 6, wherein said priorities are defined based on an E-field strength at a location at which said wireless terminal will be placed in said sixth step.

8. A storage unit recording a cell design program that is executed on an information processing apparatus provided with an input unit, an output unit, and a storage unit to determine a layout of a cell station in a wireless LAN system, said program comprising the steps of:
- a step that receives from said input unit layout information that defines a shape of a space to be designed and structures making up said space or a layout information of a makeup constituting said space, said layout information comprising a radio wave transmittancy and a reflectance of each material used in said space;
- a step that receives from said input unit terminal location information that defines a plurality of candidate locations in said space, at each of which a terminal can be placed;
- a step that calculates the number and locations of said cell stations to be installed in said space based on an E-field strength reference value of said terminals stored in said storage unit so that said cell stations are included in a communication coverage area of said cell stations, said layout information obtained, said communication coverage area and said terminal location information obtained; and
- a step that produces an output of the calculated number and locations of said cell stations
- wherein said communication coverage area of said cell station is calculated from said shape of said space and said radio wave transmittancy and said reflectance.

9. The storage unit recording the cell design program according to claim 8, said program further comprising:
- a step that receives recognition information of the cell station to be placed, wherein said calculation step also uses said recognition information of the cell station.

10. The storage unit recording the cell design program according to claim 9, wherein said output unit is a communication unit that carries out communications with a network and produces an output to said network during said output step.

11. The storage unit recording the cell design program according to claim 9, wherein said output unit is a display unit that displays said number and locations of the cell stations on a display screen thereof during said output step.

12. The storage unit recording the cell design program according to claim 9, said program further comprising the step of:
- selecting a frequency range to be used by the cell station to be placed.

13. The storage unit recording the cell design program according to claim 12, said program further comprising the step of:
- receiving noise source location information that identifies the location of a noise source, wherein the frequency range to be used is identified in said selection step based on said calculated location to be installed and said noise source location information.

14. The storage unit recording the cell design program according to claim 13, wherein noise source type information that identifies a frequency of the noise source is further received in the step that inputs said noise source information, and said frequency range to be used is identified in said selection step in such a manner as to avoid frequency ranges adjacent to said frequency of the noise source as found from said noise source type information.

15. A storage unit recording a cell design program that is executed on an information processing unit provided with an input unit and a display unit to determine a layout of a cell station in a wireless communication system, said program comprising the steps of:
- a first step that displays a layout input field on a display screen of said display unit, said layout input field receiving structure information that defines a shape or layout information of an area in which said wireless communication system is installed, is input, said layout information comprising a radio wave transmittancy and a reflectance of each material used in said space;
- a second step that displays on the display screen of said display unit a field used to receive terminal location information showing locations of terminals;
- a third step that obtains the structure information and the terminal location information received from said input unit and calculates a candidate location at which a cell station of said wireless communication system is to be installed so that said cell station is in a communication coverage area of said cell station, from the layout input receiving structure information, the terminal location information and the communication coverage area of the cell station and the communication coverage area of the terminals; and
- a fourth step that displays said calculated candidate location in said layout input field displayed on the display screen of said display unit,
- wherein said communication coverage area of said cell station is calculated from said shape of said space and said radio wave transmittancy and said reflectance.

16. The storage unit recording the cell design program according to claim 15, wherein a cell of said cell station is further displayed in the fourth step.

17. The storage unit recording the cell design program according to claim 15, said program further comprising:
- a fifth step that identifies the cell station to which said terminal is connected.

18. The storage unit recording the cell design program according to claim 17, wherein terminals to be connected to each of the cell stations are further displayed in the fourth step.

19. The storage unit recording the cell design program according to claim 18, wherein the maximum number of terminals to be connected to a single cell station is received in the second step.

20. The storage unit recording the cell design program according to claim 19, wherein, when there is a location at which a terminal is placed in an overlapping area of cells of a plurality of cell stations calculated, said fifth step assigns for the cell station to which said terminal is to be connected, through calculation, a cell station having a large number of said maximum number of terminals.

21. The storage unit recording the cell design program according to claim 18, wherein, when there is a location at which a terminal is placed in an overlapping area of cells of a plurality of cell stations calculated, said terminal is connected to a cell station having a small number of terminals connected thereto among said plurality of cell stations.

22. The storage unit recording the cell design program according to claim 15, wherein, the material of said structure is identified in the first step.

23. The storage unit recording the cell design program according to claim 22, said program further comprising the steps of:
- a sixth step that calculates a communication-deficient area in an area in which said wireless communication system is installed based on the material of said structure input; and
- a seventh step that displays in said layout input area a message for a communication-enabled area.

24. The storage unit recording the cell design program according to claim 15, wherein, the order of priority assigned to said terminals to be placed is also received in said second step, and the location at which said cell station is to be installed is calculated using the order of priority received in said third step.

25. The storage unit recording the cell design program according to claim 15, wherein, the E-field strength of the location at which a terminal having a higher priority is placed is greater than that of the location at which a terminal having a lower priority is placed at the candidate location to be installed calculated in said third step.

26. A cell design apparatus for determining the layout of a cell station in a wireless communication system, comprising:
- an input unit which receives structure information defining a shape or layout of an area in which said wireless communication system is installed, and terminal location information showing a location at which a terminal is placed and a communication coverage area of the terminal, said layout information comprising a radio wave transmittancy and a reflectance of each material used in said space;
- a processing unit that obtains the structure information and the terminal location information, and calculates a candidate location of a location at which a cell station is to be installed in said wireless communication system such that said cell station is included in a communication coverage area of the cell station, based on the structure information, the terminal location information, the communication coverage area of the cell station, and the communication coverage area of the terminal; and
- a display unit that displays a layout of the candidate location of the location at which said cell station is to be installed, said candidate location being calculated by said processing unit,
- wherein said communication coverage area of said cell station is calculated from said shape of said space and said radio wave transmittancy and said reflectance.

* * * * *